United States Patent [19]

Blum

[11] Patent Number: 4,688,222
[45] Date of Patent: Aug. 18, 1987

[54] BUILT-IN PARALLEL TESTING CIRCUIT FOR USE IN A PROCESSOR

[75] Inventor: Arnold Blum, Gechingen, Fed. Rep. of Germany

[73] Assignee: International Business Machines Corp., Armonk, N.Y.

[21] Appl. No.: 810,105

[22] Filed: Dec. 17, 1985

[30] Foreign Application Priority Data

Jan. 4, 1985 [EP] European Pat. Off. ........ 85001083.6

[51] Int. Cl.[4] ............................................. G01R 31/28
[52] U.S. Cl. .................................... 371/25; 324/73 R
[58] Field of Search ............... 371/15, 16, 27, 25; 364/200, 900; 324/73 R, 73 AT

[56] References Cited

U.S. PATENT DOCUMENTS

| 4,476,431 | 10/1984 | Blum ................................... 371/25 |
| 4,498,172 | 2/1985 | Bhausar ................................ 371/25 |
| 4,517,672 | 5/1985 | Pfleiderer ............................. 371/25 |
| 4,534,028 | 8/1985 | Trischler .............................. 371/25 |
| 4,553,236 | 11/1985 | Zasio ................................... 371/25 |
| 4,554,664 | 11/1985 | Schultz ................................ 375/25 |

Primary Examiner—Michael R. Fleming
Attorney, Agent, or Firm—Mark Levy

[57] ABSTRACT

The invention concerns arrangements and methods for error testing and diagnosing processors (e.g., 9; FIG. 2), whose logic subsystems (20) are interconnected by storage elements (23, 24) which in the error test and diagnostic mode are connected in the form of shift register means for the shift clock controlled application of test data and for receiving result data, and which comprise means (58) for comparing the actual result data with desired result data, said means setting an error indicator (59) for initiating further actions in the case of a mismatch. For testing the correct implementation of operations and operational secondary functions, a signature generator circuit (30) is provided comprising a test accumulator (51, 52, ..., 5m) for accumulating the test and result data from the storage elements (23, 24) and a test clock generator and counter (28) for controlling the accumulation, as well as a test memory (29) providing test programs consisting of test data, desired result data and instructions to be tested of the processor instruction set. The signature generator circuit (30) is connected to an interface register (11, 12, ..., 1m) and/or a system bus (8) of the processor, the stages of the interface register being included in the shift register means consisting of the storage elements (23, 24) at positions 21, 22, ..., nm.

13 Claims, 4 Drawing Figures

BUILT-IN PARALLEL TESTING CIRCUIT FOR USE IN A PROCESSOR

The invention concerns an arrangement for error testing and diagnosing a processor as well as methods for its operation.

BACKGROUND OF THE INVENTION

The testing of very large scale integrated logic and storage circuits on chips, of which electronic controls, processors and other data processing systems consist, is based to a considerable degree on the accessibility of the storage elements on the chips. It is in connection with these components that problems arise, since digital systems necessitate a very high error coverage and the testing of very large scale integrated circuit structures consumes much time and is very expensive in view of the circuit density of VLSI (Very Large Scale Integration) chips. Data processing systems, such as microprocessors, consist of or comprise highly complicated chips which have to be tested taking account of a vast number of states bistable storage elements may assume and of an even vaster number of state sequences such processor storage elements pass through during the execution of program routines.

Assuming a micro instruction to be a finite functional value, then the testing of the generally well-specified and well-defined function of a micro instruction, such as the setting of bistable switches indicating the states of an arithmethic and logic unit (ALU) after execution of an ADD micro instruction, poses problems that are not too difficult to resolve. Serious problems are encountered however if all possible secondary functions of the ADD micro instruction are to be tested, such as whether the state of a bistable switch, for instance that indicative of bus requests occurring during the execution of the ADD microinstruction, has changed or not.

Secondary functions generally require a large number of bistable switches or storage elements which are associated with the data flow and the control logic of the microprocessor. Generally, such storage elements are not directly accessible for test purposes, not even by special micro instructions, without changing the respective current states of the bistable switches or storage elements used for state indication.

Testable very large scale integrated logic structures and system architectures frequently utilize LSSD (Level Sensitive Scan Design) rules, according to which a logic subsystem, for instance, is signal level dependent if and only if the response in the steady state to an input signal change is independent of circuit and bus delays within that logic subsystem (cf. "A Logic Design Structure for LSI Testability" by E. B. Eichelberger—Proceedings of the Design Automation Conference, No. 14, June 20 to 22, 1977, New Orleans, La., pp. 462 to 468).

Based on these LSSD design rules, the various storage elements on a chip are monitored and adjusted by linking the master-slave flip-flops, forming part of the logic and positioned between the logic stages, in the test mode as one or several shift register chains through which the test patterns are shifted into and result patterns are shifted from the very logic.

Such shift register chains also permit shifting complete flip-flop or register status information of complex logic stages, limited with regard to their packaging, such as a chip or a module.

Such a register concept has the added advantage that only relatively few input/output connections are required and that a high degree of flexibility is obtained between the various packaging levels if all first packaging level shift register chains are connected to a common second packaging level shift register chain, and so on, without affecting the logic design within the chips.

As the storage elements of a processor are almost invariably designed as shift register stages, the secondary functions can either be tested by an integrated maintenance and service processor or by a connected separate tester such that before and after execution of the micro instruction to be tested the contents of the bistable storage elements, connected for testing in the form of shift registers, are shifted into the maintenance and service processor or the tester, by means of which the difference in states is compared with predetermined desired values.

Another considerable improvement of the diagnostic capability of micro instruction tests during the exchange of data and instructions between processing units and processors may be obtained by applying the test procedures to even tighter functional values, such as the clocking steps of the micro instruction to be tested. This would lead to a considerably improved error coverage of automatic tests.

However, the afore-mentioned test methods have the disadvantage that they require the states stored in a very large number of bistable circuit elements to be transferred at very high speeds, which would have to be effected by the maintenance and service processor or a factory tester unsuitable for such application because of their slow test circuits and their serial shift mechanism. Apart from this, the clocking speed of the shift means cannot be increased further despite the high-speed technology of processor chips, since such a known shift chain comprises two slower networks, one of which extends from the processor or the processing unit to the maintenance and service processor and the other from the maintenance and service processor to the processor (cf. FIG. 1, lines 14 and 13).

Data processing systems generally comprise parallel high-speed system buses interconnecting several units, such as the processors 9, 10 ... n, the main storage 3, the main storage control 4, the input/output device control 5 and, if necessary, the maintenance and service processor 6, as shown in FIG. 1. In known data processing systems, however, these system buses are normally not provided for direct access of the maintenance and service processor to the bistable elements of the processors which also contain status information, an exception being the test and diagnostic device for digital computers, as described in the European Patent Application No. 83 105 172.7. In that data processing system, the storage elements (flip-flops), interconnecting the logic subsystems during normal operation, are connected in the form of an addressable array for the error test and diagnostic mode, so that the unit to be tested receives from the maintenance and service processor on the fast system bus address information for controlling the individual storage elements of the array, test data for storage therein, and test control and clock information. Upon completion of testing, the result data of the logic subsystems are written into the connected storage elements. From these storage elements, connected in the form of an array, the result data are fed on the system bus to the maintenance and service processor with the aid of address and control information also transferred on that bus.

As the storage elements of the array consist only of master flip-flops, they may not be realized as usual in the form of shift registers comprising master-slave flip-flops, which is highly disadvantageous for many design concepts of data processing systems.

For data processing systems, whose storage elements are made up of master/slave flip-flops, the European Patent Application No. 83 112 339.3 describes a concept for the fast exchange of test data on the system bus, wherein the interface register stages, positioned between the system bus 8 and the processors 9 to n (cf. FIG. 1), are included in the shift register chain which is arranged in garland shape and whose start and end are connected during testing by a controlled switch 44 (cf. FIG. 2).

During testing, the input of test data and the output of result data, which in each case are effected on the system bus, overlap internal shift steps of the garland-shaped shift register chain.

Another disadvantage of known systems is that the test bus 13, 14 has only one core, so that line interruptions may lead to total failure of the test bus and thus of the data processing system, since the maintenance and service processor, in addition to test functions, generally performs system service functions by controlling, for instance, the system console from the display screen and the keyboard.

Serious problems in electronic data processing systems are caused above all by intermittent errors, especially if they are dependent on the system environment. Faulty supply networks, electrostatically charged floor coverings as well as high-frequency disturbance resulting from high-frequency generators of laboratory and manufacturing equipment installed in the vicinity of data processing systems are frequently the cause of intermittent errors. In such cases, micro instruction test programs fail as an instrument for systematically detecting errors and their causes.

Thus, it is the object of the invention to provide an arrangement of relatively simple design, by means of which electronic data processing equipment can be reliably error-tested at high speed also with respect to intermittent errors.

Thus, the invention has the advantage that electronic data processing systems with very large scale integrated circuits can be error-tested extremely economically, at high speed and very thoroughly.

SUMMARY OF THE INVENTION

In accordance with the present invention, there is provided an arrangement for error testing and diagnosing a processor whose logic subsystems are interconnected by storage elements. A comparator is provided to compare actual results with desired results. An error indicator is set in the case of a mismatch. A signature generator circuit is provided. It comprises a test accumulator, a test clock generator, a counter and a test memory for storing test programs and data. Also provided are an interface register and processor system bus. The stages of the interface register contain data that is input to the test accumulator of the signature generator circuit.

BRIEF DESCRIPTION OF THE DRAWINGS

An embodiment of the invention will be described in detail below with reference to drawings, in which.

DETAILED DESCRIPTION OF THE PREFERRED EMBODIMENT

Figure 1:
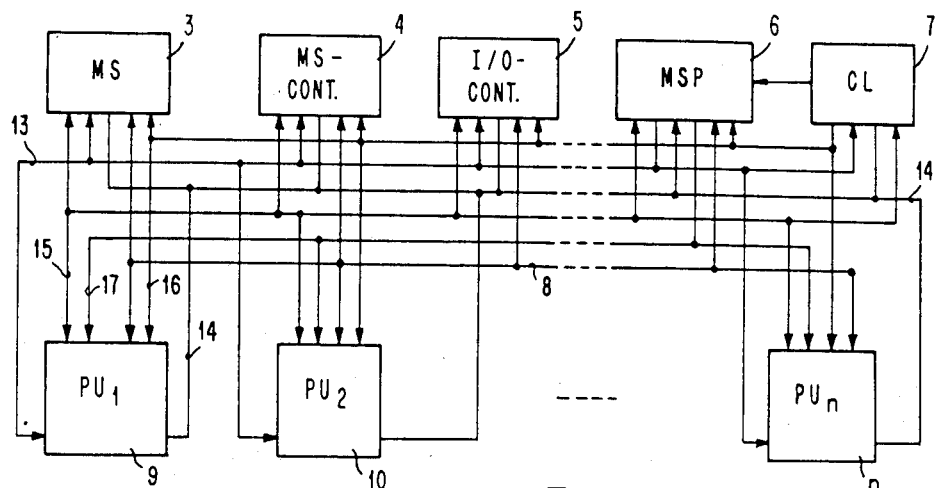
FIG. 1 is a block diagram of a modular electronic data processing system.

FIG. 1 is a block diagram of a modular data processing system comprising single-chip processing units or processors (PU1-PUn) 9 to n which are interconnected by a system bus 8, in addition to being connected to a main storage (MS) 3, a main storage control unit (MS-CONT) 4, an input/output device control (I/O-CONT) 5, and a maintenance and service processor (MSP) 6. In addition, there are connections 13 to 17 between the afore-mentioned system components on the one hand and the maintenance and service processor 6 on the other, by means of which control and clock signals as well as test data are transferred. The lines provided for also include a clock line 15 linking the system components and a maintenance and service processor 6 which, as shown in FIG. 1, is also connected to the clock generator (CL) 7. In lieu of a central clock generator, such as clock generator 7, the system components, in particular the processors 9 to n, may also be provided with individual clock generating means on their respective chips.

Figure 2:
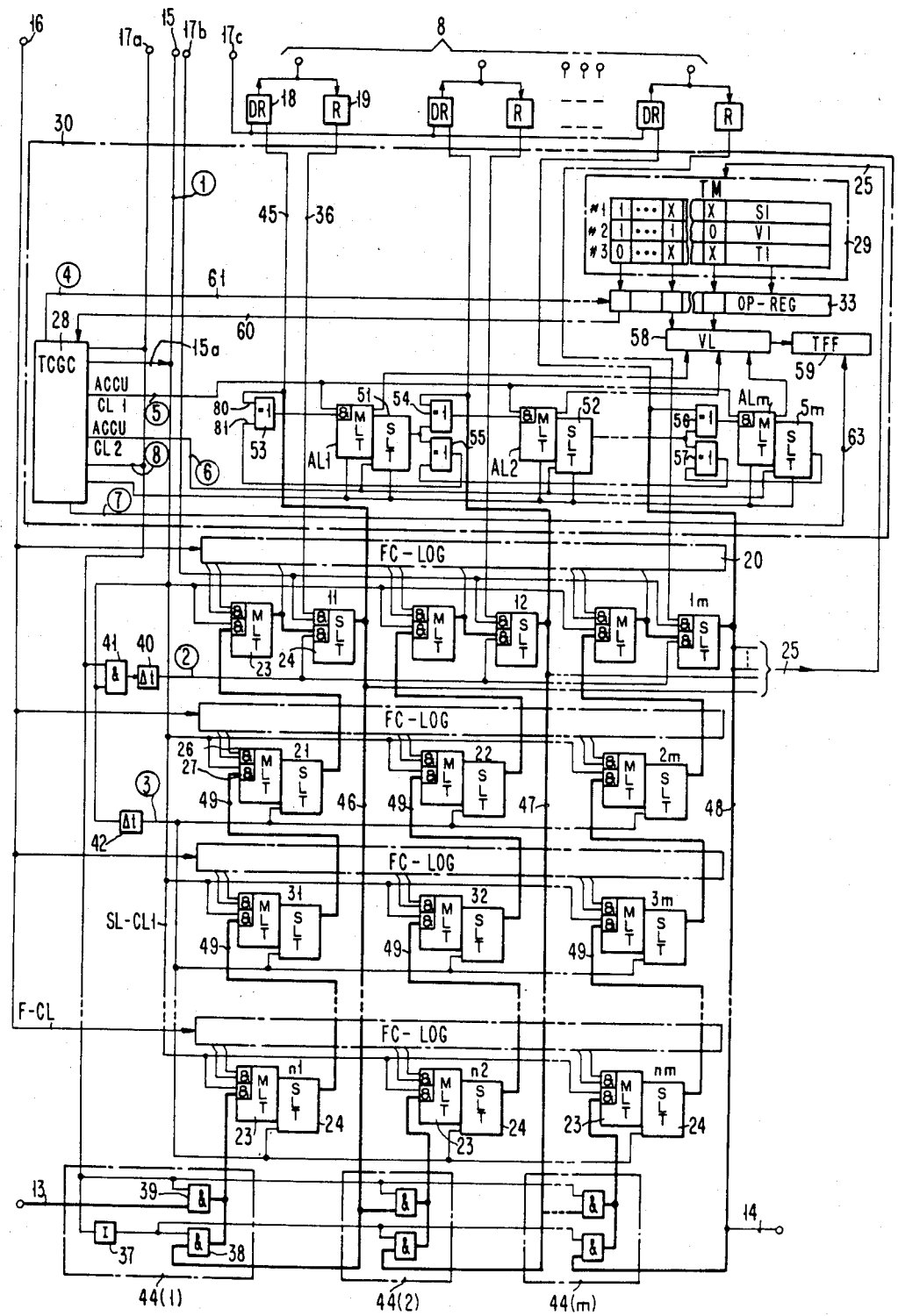
FIG. 2 is a block diagram of a data processing system comprising circuits for an error test and diagnostic arrangement.

How error tests may be performed in the single-chip processors 9 to n without any major support for the maintenance and service processor 6 is shown by the circuits according to FIG. 2. The illustrated circuits and the relevant descriptions relate to processor 9. As for error testing, the remaining processors of the system are analogously designed. For the present embodiment, system bus 8 is assumed to have a width of 4 bytes. The bus transmitter circuits (DR) 18 and the bus receiver circuits (R) 19 are adapted to that width.

The storage elements 23, 24, which in most cases are polarity hold flip-flops, are designed as master-slave flip-flops according to the previously mentioned LSSD rules and are combined in the form of shift register chains in the test mode.

FIG. 2, bottom left at position n1, shows the input stage of a shift register chain connected to the maintenance and service processor 6 by a switch 44(1), consisting of an inverter 37 and two AND gates 38 and 39, and through line 13 of the test bus.

The chain continues with the shift register stages in positional order $(n-1)1, (n-2)1, \ldots, 31, 21, 11, n2, 32, 22, 12, \ldots, nm, 3m, 2m$ and $1m$, the output of the chain and the slave flip-flop (SLT) at position $1m$ being connected through the outgoing line 14 of the test bus to the maintenance and service processor 6 and the input of the chain through the left switch 44(1) and the master flip-flop (MLT) of the input stage n1 to the incoming line of the test bus 13. In this manner, a connection is obtained between the maintenance and service processor 6 and the processing unit to be tested, for instance, processor 9.

The afore-mentioned switches 44(1) and 44(m) serve to connect the output of the associated shift register partial chain, arranged in columns at positions n1, 31, 21, 11 or n2, 32, 22, 12 or nm, 3m, 2m, 1m, to the respective input, so that the information stored in the shift register stages is capable of circulating in the shift register chain or the partial chains step-by-step from one stage to another.

In known data processing systems, the test data or test patterns are serially shifted on line 13 from the maintenance and service processor 6 into the shift register chain, using a shift clock which through a test shift clock line 15 is applied by the maintenance and service processor 6 to the processing unit to be tested. This shift clock, which is designated as SH-CL1 in the figures and which corresponds to the first shift register stage clock to be applied and which furthermore controls the transfer of data into the master flip-flop 23, is delayed in a delay element 42 on the chip by the time $\Delta t$. This delayed clock, designated as SH-CL2, corresponds to the second shift clock of a shift register stage which controls the receipt of data by slave flip-flop (SLT) 24 from the preceding master flip-flop.

The test data are normally entered into the shift register chain on line 13 or the system bus 8. Having been entered into the individual shift register stages, the test data are fed to the logic subsystems (FC LOG) 20 to be tested. These logic subsystems 20 are generally made up of logic stages of various kinds, such as NAND-NOR inverters, EXCLUSIVE-OR circuits, and the like. The test data are processed in the logic subsystems 20 under control of the function clock signals F-CL which are either transferred on line 16 from the central clock generator 7 to the processor 9 or which are generated by a clock generator associated with the processor (not shown).

The response of the logic subsystems 20 to the test data, i.e., their result data, is subsequently stored in the shift register stages and in known data processing systems (cf. European Patent Application No. 83 112 339.3) shifted on line 14 or system bus 8 by clocks SH-CL1 and SH-CL2 into the maintenance and service processor 6 for analyzing or diagnosing errors.

The approach used by the invention is different. In lieu of transferring the flip-flop information before and after execution of a micro instruction to the maintenance and service processor 6 for comparison with predetermined correct data, the test means of the processing units 9 to n or the maintenance and service processor 6 are provided with signature generator circuits 30 arranged between the transmitter and receiver circuits 18 and 19 of system bus 8 and the interface registers consisting of the master-slave flip-flops at positions 11, 12, ..., 1m and generating for each micro instruction a significant bit configuration which is compared on the chip with a correct bit configuration significant of the respective micro instruction.

For executing these test jobs, the signal generator circuit 30 comprises a test program memory (TM) 29 of its own, which is loaded through system bus 8, the previously mentioned interface registers 11, 12, ..., 1m and a (multi-core) line 25, as well as a test clock generator and counter (TCGC) 28, an operation register (OP-REG) 33, a compare circuit 58, a test pattern accumulator made up of the flip-flops 51 to 5m at positions AL1 to ALm, and the EXCLUSIVE-OR circuits 53 to 57. As is also shown in FIG. 2, both the test pattern accumulator and the compare circuit 58, which similar to the remaining components are arranged on the processor chip 9, are controlled by the test clock generator and counter 28. The latter also supplies the shift clocks for the shift register chains and partial chains, respectively, of the processor. As shown in particular in the time diagram of FIG. 3, the operational steps of the signature generator circuit 30 are synchronized with the execution of the instruction to be tested by an instruction stop bit stored in the first bit position of the test micro instruction in test program memory 29 and fed to the test clock generator and counter 28 through operation register 33 and line 60.

Before execution of the instruction to be tested, the contents of all bistable storage elements of the processor, which form part of its data flow and control logic, are circularly shifted in the shift register chains to the signature generator circuit 30, generating a significant initial value. The interconnection of the bistable storage elements in the form of a garland-shaped chain, the transfer of the test patterns and the clock-controlled transfer of the test and result data are described in detail in the European Patent Application No. 83 112 339.3. The concept described in that application permits the states of the various bistable storage elements of processor 9 to be monitored and processed by the signature generator circuit 30 instead of first transferring them to a tester, thus considerably reducing the time required for error testing and diagnosis.

As in many cases, the bistable storage elements, after having been monitored by the signature generator circuit 30, have to be restored in their original states during testing, other parallel shift paths can also be used, such as those shown in FIG. 2 where the remaining switches 44, in addition to those mentioned in conjunction with the input stage n1, subdivide the garland-shaped shift register chain for instance into parallel, independent partial chains in which the test and result patterns are shifted in parallel. In principle, other shift register configurations are also conceivable, depending upon the setting of switches 44. Any such subdivisions lead to a considerable reduction in testing time. Error testing may be speeded up even further by generating the shift clocks on the same chip, as this permits shifting at a much higher frequency.

After the contents of all bistable storage elements have been circularly shifted and the relevant values (for instance the different states) been accumulated, the instruction to be tested is executed in a single step (single instruction step) or in a single instruction cycle step, subsequently performing a renewed circular shift of the contents of the bistable storage elements. Upon completion of circular shifting, the test pattern accumulator contains significant data on the state of all bistable storage elements after full or partial execution of the aforementioned instruction.

Thus, the states of the bistable storage elements are the result of stimuli (test patterns) applied to the processor logic at the time of status initiation and of steps provided for during the execution of the instruction to be tested.

At the end of testing, the signature generator circuit 30 contains a test result that also comprises portions of states of secondary processor circuit functions which were previously neglected during the usual functional micro instruction test program cycles. The signature information, i.e., the accumulated states of the bistable storage elements during full or partial execution of an instruction, say #2, is then compared in the usual manner with expected, previously computed desired values which are read, for instance, from test program memory 29 along with the operation code of the instruction to be tested. Similar to the remaining circuit structure, test program memory 29 may also be arranged on the same processor chip.

The desired values may, for example, be correlated with instruction addresses but they need not be stored in test program memory 29 for each instruction, as an address translation mechanisms may be used if the states of the bistable storage elements are not data-dependent. The desired values are then automatically supplied at high speed. The compare step, instead of being performed in the signature generator circuit 30, may be transferred to a connected maintenance processor or a factory tester that may be linked to the parallel system bus 8.

Figure 4:
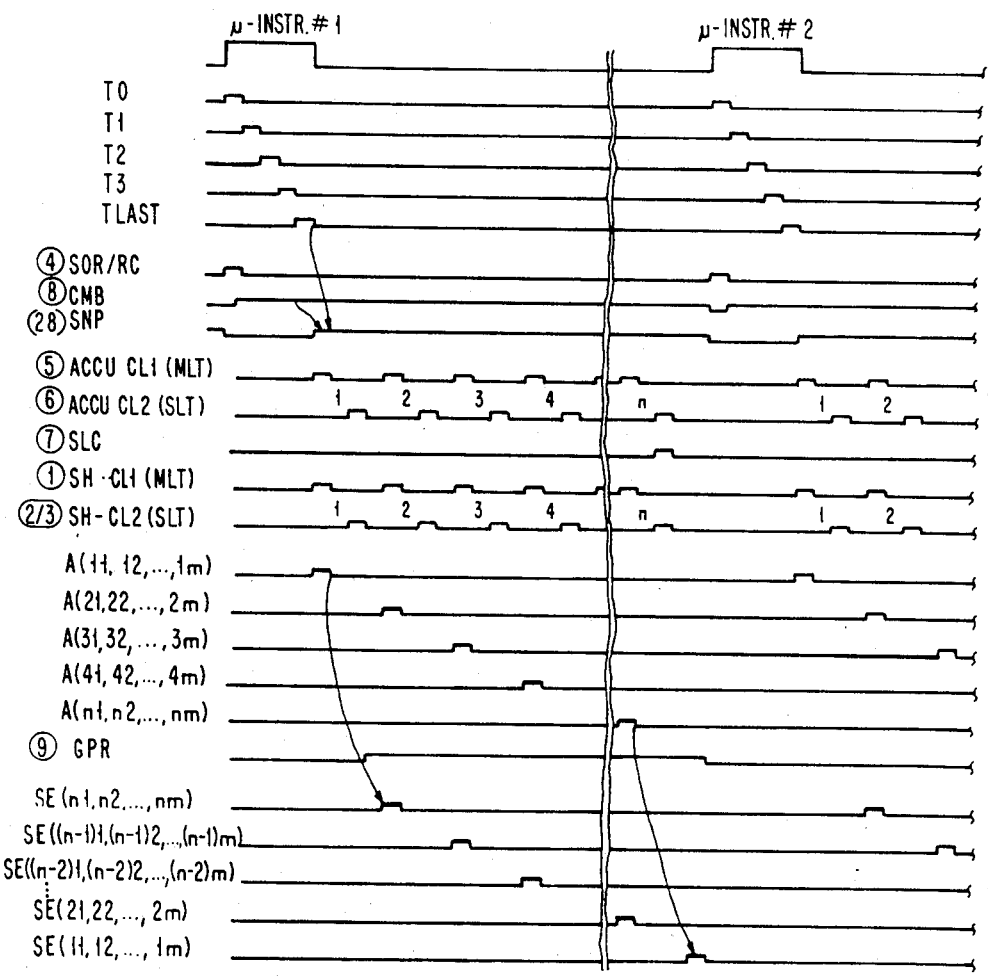
FIG. 4 is a time diagram illustrating the error test and diagnostic operations in the circuits according to FIGS. 2 and 3.

The operation of the signature generator circuits 30 may best be explained with reference to the control pulse diagram of FIG. 4. The upper-most line of this diagram shows a section of a micro instruction sequence, as it is read from test program memory 29, with the μ-instructions #1 and #2. The indicated micro instructions have a cycle length of 5, i.e., they are controlled by 5 cycle time pulses T0, T1, T2, T3 and TL (L serving to designate the last cycle time pulse). These pulses are shown in FIG. 4 in the subsequent five lines (2 to 6).

The test clock generator and counter 28 initially supplies a signal ④ (line 7), by means of which the internal counter is reset (RC) and the operation register 33 is set through the line 61 (SOR). This causes the set instruction #1 to be transferred from test program memory 29 to the operation register 33 and thus to be included in the accumulation process. The control actions required are triggered from the operation register 33. Micro instruction #1 in test program memory 29 is a set instruction (SI) including in its first bit position a stop bit set to 1. This stop bit is fed on line 60 to test clock generator and counter 28 which in the course of the first instruction cycle T0 sets a test mode bit ⑧ CMB (line 8) which remains set until the next micro instruction #2, an instruction to be tested (Vi).

In the last instruction cycle TL, a signal SNP (line 9) is generated in the test clock generator and counter 28 and remains set until the start of the next micro instruction which stops the normal instruction processing cycle, controlling the control unit necessary for that purpose; concurrently with the signal SNP, for example, the test clock generator and counter 28 starts the accumulator clock ACCU CL1 which after a particular delay time is followed by the accumulator clock ACCU CL2. As a result, the accumulator is conditioned to receive data from the bistable storage elements of the processor. Accumulator clocks ACCU CL1 and ACCU CL2 are designated as ⑤ and ⑥ in lines 10 and 11 of FIG. 3.

Figure 3:
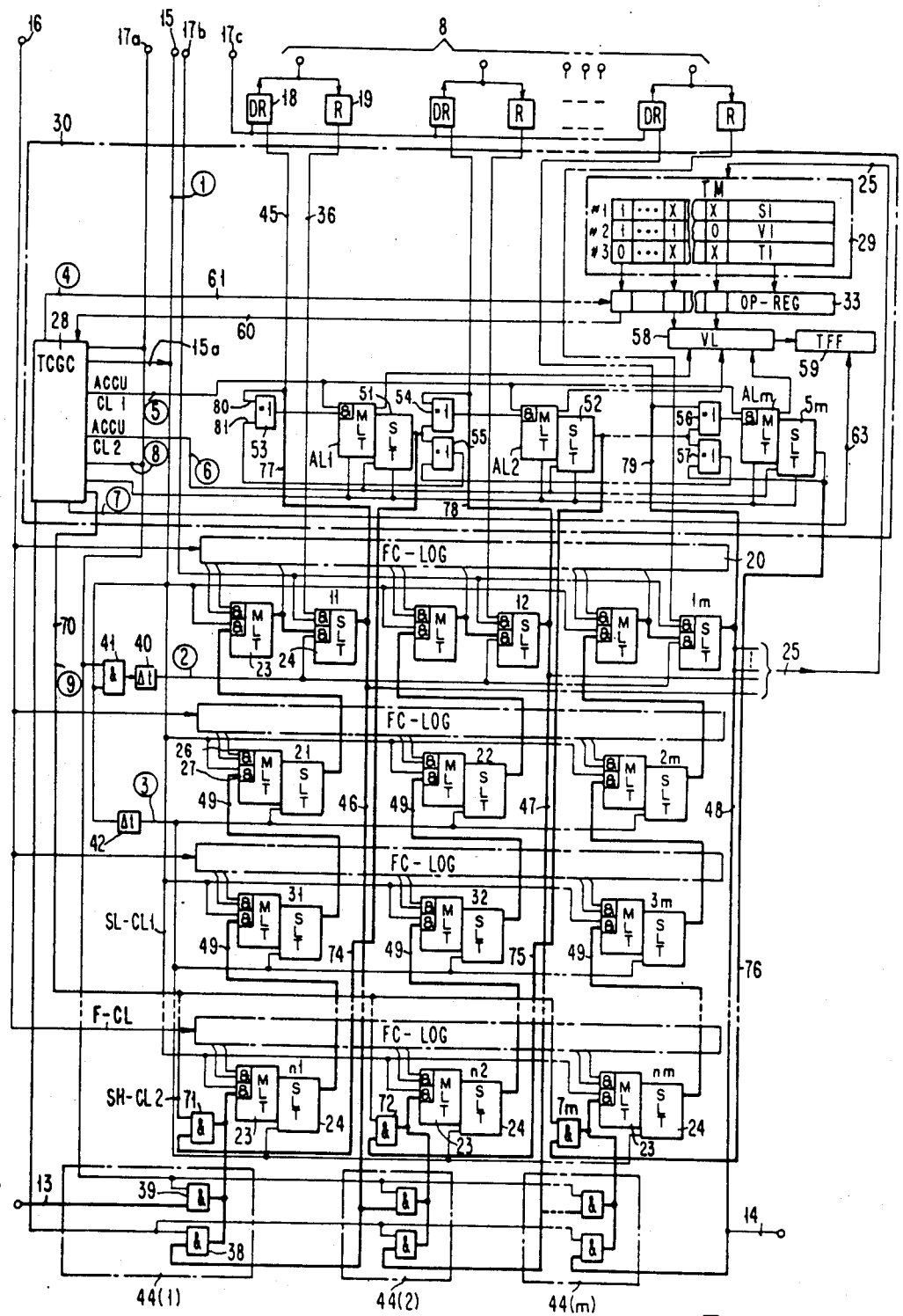
FIG. 3 is a block diagram of a processing system comprising modified circuits for an error test and diagnostic arrangement according to FIG. 2.

Roughly synchronously and in-phase with the accumulator clock ACCU CL2, the shift clock SH-CL1 is then transferred on control line 15a from the test clock generator and counter 28 or the maintenance and service processor connected by line 15 or a factory tester (cf. signal ① (line 13 ). By means of a delay element (Δt) 42, the second shift clock SH-CL2, designated as ③ (line 14) in FIG. 3, is generated but only for the bistable storage elements at positions 21 to nm. For the bistable storage elements at positions 11 to 1m, the second shift clock, designated as ② (also in line 14 of FIG. 4), is generated by a delay element (Δt) 40 switched by means of an AND gate 41. The control signal for the AND gate is transferred from the maintenance and service processor on line 17a. The other of the two inputs of AND gate 41 is connected to line 15 which transfers the shift clock SH-CL1.

Lines 15 to 19, FIG. 4, show quite clearly how the shift pulse pairs SH-CL1/2 cause the contents of stages 11, 12, ..., 1m; 21, 22, ..., 2m; 31, 32, ..., 3m; 41, 42, ..., 4m; to be fed to the accumulator stages 51, 52, ..., 5m. The times at which the values A (i, j) are available are indicated by the afore-mentioned lines 15 to 19 in FIG. 4.

By the end of n transferred shift pulse pairs SH-CL1/2, the states and/or contents of all bistable storage elements of the processor 9, which are arranged in the shift register partial chains, have been fed to the signature generator circuit 30 where they are available as an accumulated value in the bistable circuit elements 50 or 52 for comparison with a predetermined desired value. Accumulation of the values is effected by the shift clock pair ACCU CL1/2 of the test pattern accumulator.

As shown by the structure of the test pattern accumulator in FIG. 2 , the bits stored in the slave flip-flops of the bistable storage elements 50 to 52 are in each case EXORed with bits received from the bistable circuit elements of the processor chip. For accumulation, the bits may also be combined by ANDing.

After the last pulse n of the accumulator clock ACCU CL2 has been applied, the signature, stored in the test pattern accumulator at that time, is compared in the compare logic (VL) 58 with the predetermined desired value, setting a test flip-flop (TFF) 59 in the case of a mismatch. This process is time-controlled by a signal SCL generated by test clock generator and counter 28 and fed to test flip-flop 59 on line 63. The time of its occurrence is shown in the signal train ⑦ (line 12) in FIG. 4.

By means of the error test shown in FIGS. 2 and 4, which also extends to any secondary functions, a considerably increased error coverage is obtained over functional micro instruction test programs. This improves functional testing still further which does not only cover static but also dynamic errors of all kinds, including technology and design-relevant errors. The improved error coverage is essentially attributable to the circuit-controlled diagnostic compare function of the states of the processor-internal bistable storage elements after full or partial execution of an instruction. These tests may also be used for the continuous execution of chains of (micro) instructions as well as for machine instructions. The described mechanism is not only limited to manually generated deterministic test programs but it is also possible to use pseudo-generated test programs (pseudo-random operation codes and data manipulation) as stimuli.

The described error tests may also be used for application programs with intermittent errors. The difference between these tests and special micro instruction test programs is that the latter generate only status data which are known from the micro instruction test program generator, whereas application programs generate status information which is not known in advance and which essentially depends on the user data. The desired data necessary for comparison with the accumulated test data have to be empirically determined by means of a machine that is fully in tact. Application programs, however, must be executed in the usual operating mode to prevent the environment in which errors occur from being changed.

Repeated runs of the application programs to be tested in the same data environment ensure that the state pattern sequences of the processor are identical for each run, as in nearly all cases the application processes are synchronous and thus deterministic, which holds in particular for the circuits of the processor data flow.

For realizing such a test mechanism, a desired value field is associated with each machine instruction of the application program instead of with each micro instruction or each partial micro instruction. The desired and the actual values need not be compared immediately for each instruction. This may be done instead after a chain of instructions (a partial program) has been implemented. The advantage of this is that the space required for storing the desired values is reduced to a minimum. The storage for the desired values is preferably arranged on the same chip as the signature generator circuit 30 and the appertaining data processing means.

As the desired values are dependent on the user data, they cannot be predetermined by the manufacturer of the data processing system. Because of the intermittent nature of hardware errors, there are user program runs that are non-erroneous and those that are not. During a non-erroneous run, the user-dependent desired values are automatically generated by the signature generator circuit 30 for application program instructions and automatically stored in the associated desired value fields.

An intermittent erroneous program may be restarted with the same initial data in a test rather than in the desired value generation mode, and this may be done many times until the error occurs. The procedures required for this purpose can be automatically performed by a connected maintenance and service processor which is also capable of performing diagnostic functions. Such a test means is particularly beneficial since for stimulating the processor circuits not only artificially generated test patterns but also real patterns of the application program are used on the basis of user-dependent data. The artificially generated test patterns, such as pseudo-random patterns or patterns for testing stuck-at or constant faults, have, as is known, several disadvantages. They are not available in a particular error scenario, they are not exhausting or the number of patterns is so great that the probability of coincidence with the intermittent hardware error is low.

Similar to the test arrangement shown in FIG. 2, the circuit arrangement of FIG. 3 initially serves to accumulate the states of internal storage elements of a processor after execution of a micro instruction or a single subcycle of such an instruction (e.g., EXCLUSIVE-OR accumulation).

Thus, the test and/or test input pattern is generated by means of the previously executed micro instruction and/or a subcycle of such an instruction. After execution of the next micro instruction, the result pattern is obtained in the individual storage elements. This pattern serves as an input test and/or test pattern for executing the next but one micro instruction and is generated after execution of the second micro instruction. To ensure that after accumulation the correct input test and/or test pattern is maintained in the internal storage elements of the processor before the third micro instruction is executed, switches 44(i) are activated during accumulation, so that the status information of the internal storage elements is circularly shifted, thus retaining their original information.

For improving the test patterns by combining instruction-generated test patterns and random test patterns, the circuit arrangement shown in FIG. 2 is expanded in the form shown in principle in FIG. 3. The expanded circuit arrangement comprises additional second switches 71, 72 and 7m as well as connecting lines 70, 74, 75, 76, 77, 78 and 79 which ensure that during circular shifting not the contents of the storage elements from the upper end (storage elements 11, 12, ..., 1m) of the shift rings, made up of the internal storage elements, but the respective accumulated intermediate values from the accumulator are fed back.

The accumulated values are fed from the slave latch (SLT) 51 on line 74 and by switch 71 to the master latch (MLT) at position n1. Further feedback operations are effected from the slave latch (SLT) 52 on line 75 and by switch 72 to the master latch at position n2, and so on, until finally the last feedback operation from the slave latch (SLT) 5m on line 76 and by switch 7m is effected to the master latch (MLT) at position nm. The switches are controlled by the test clock generator and counter 28 through line 70 and signal ⑨ GRP.

Circular shifting with the intermediate values of the test pattern accumulator produces in the internal storage elements a new test pattern differing from that after execution of the second micro instruction. After application of the functional clocks F-CL, a new result pattern is obtained which is also accumulated so that circular shifting in the partial shift chains with the respective intermediate values of the test accumulator yields yet another new test pattern.

By combining the two circular shifts in the partial shift chains, a large variety of test patterns is obtained in a space saving manner, leading to a high error coverage even during the execution of micro instruction test programs, with a micro instruction executed in the intervening time determining the random nature of the test patterns generated by the modified test means according to FIG. 3.

The time sequence of random test patterns is shown in FIG. 4, lines 20 to 25. This special test mode is set by a signal ⑨ GRP which test clock generator and counter 28 applies on line 70 to the switches 71 to 7m, setting them such that the accumulated data are fed from the slave latch SLT of the respective stage to the master latch of the first stage of the associated partial shift chain. Thus, in response to signal ⑨, i.e., with switches 71 to 7m being switched by the respective next pulse of the shift clock SH-CL1, the first accumulated value from the slave latch stages of the test accumulator is entered into the bottom-most shift register stage of all partial chains, i.e., stages n1, n2, ..., nm. Further shift pulse pairs SH-CL1/2 finally lead to random test data to be applied to all stages of the shift register partial chains. It is pointed out once more that the application of test signals overlaps the generation of the result data.

I claim:

1. A circuit for error testing and diagnosing a plurality of logic subsystems of a processor by means of stored test data, the circuit comprising:
   (a) a parallel communications bus operatively connected to a plurality of logic subsystems in a processor;
   (b) a signature generator circuit operatively connected to said parallel communications bus for developing a pattern sequence of bits for application to said logic subsystems, said signal generator circuit comprising:
       (i) test data storing means;

(ii) clock signal generating means operatively connected to said test data storing means;

(iii) test accumulator means for storing test results provided by said parallel communications bus;

(iv) comparator means operatively connected to said test accumulator means and to said test data storing means;

(v) error indicator means operatively connected to said comparator means for indicating a mismatch between the data from said test accumulator means and the test data; and (c) storage element means operatively connected to said parallel communications bus and interconnecting said logic subsystems to one another so that all subsystems operatively connected to said parallel communications bus can be tested in parallel with one another by said signature generator circuit.

2. The circuit in accordance with claim 1 wherein said signature generator circuit is built-in to said processor whose logic subsystems are under test.

3. The circuit in accordance with claim 1 further comprising:

(d) a processing unit operatively connected to said parallel communications bus and in operative relationship with said signature generator circuit.

4. The circuit in accordance with claim 3 wherein said signature generator circuit forms a part of said processing unit.

5. The circuit in accordance with claim 4 wherein said signature generator circuit is capable of testing said processing unit and any of said logic subsystems of said processor.

6. The circuit in accordance with claim 1 wherein said test accumulator means is interconnected with means for generating test patterns.

7. The circuit in accordance with claim 6 wherein said test pattern generator means comprises exclusive OR gates and shift registers.

8. The circuit in accordance with claim 1 wherein said test data storing means is a read/write memory.

9. The circuit in accordance with claim 8 wherein said read/write memory has loaded therein a series of patterns corresponding to the patterns resulting from application of bus instructions to said logic subsystems.

10. The circuit in accordance with claim 1 wherein said test data storing means contains test programs that are capable of executing in substantially the same time as are user programs.

11. The circuit in accordance with claim 10 wherein test program data rates and user program data rates are substantially the same.

12. The circuit in accordance with claim 1 wherein data from said storage element means is readable as an array.

13. The circuit in accordance with claim 12 further comprising reconfiguration means operatively connected to said storage element means for allowing data therefrom to be accessed serially.

* * * * *